July 18, 1939.  L. J. WHITE  2,166,922

LIQUEFIED GAS DISPENSING SYSTEM

Filed Jan. 11, 1937  3 Sheets-Sheet 1

Inventor
L. J. White
By A. D. Adams
Attorney

July 18, 1939.  L. J. WHITE  2,166,922
LIQUEFIED GAS DISPENSING SYSTEM
Filed Jan. 11, 1937   3 Sheets-Sheet 2

Inventor
L. J. White
By A. D. Adams
Attorney

July 18, 1939.  L. J. WHITE  2,166,922
LIQUEFIED GAS DISPENSING SYSTEM
Filed Jan. 11, 1937   3 Sheets-Sheet 3
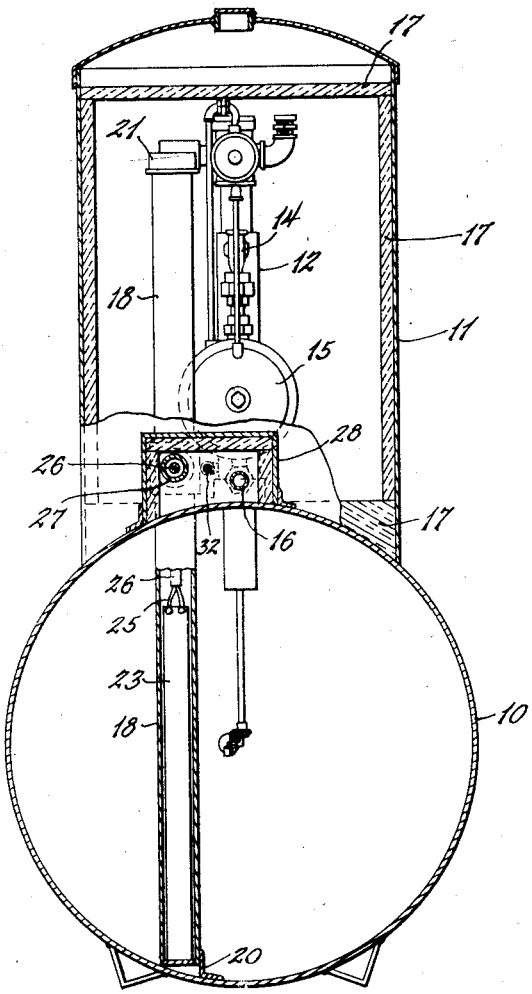
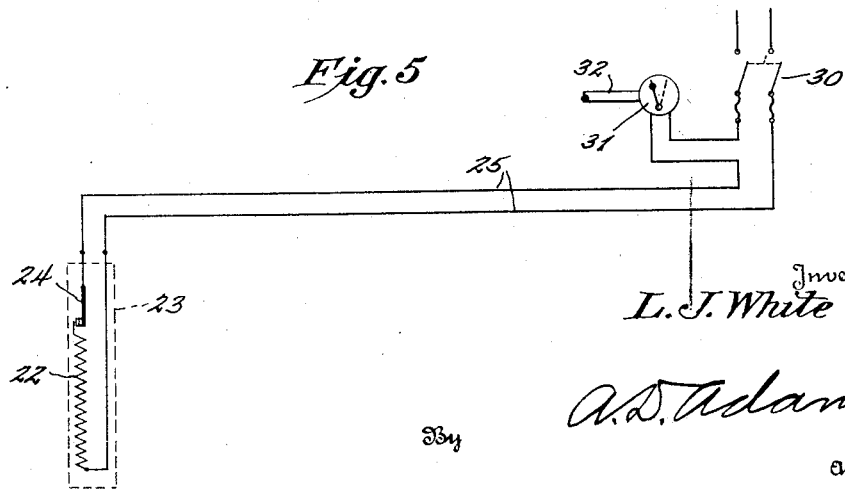
Inventor
L. J. White
By A. D. Adams
Attorney Patented July 18, 1939

2,166,922

UNITED STATES PATENT OFFICE 2,166,922

LIQUEFIED GAS DISPENSING SYSTEM

Loyd J. White, San Antonio, Tex., assignor to Southern Steel Company, a corporation of Texas Application January 11, 1937, Serial No. 120,109

5 Claims. (Cl. 219—39)

This invention relates to liquefied gas dispensing systems of the general type disclosed in my Patent No. 2,042,439, dated May 26, 1936, and, among other objects, aims to provide a system having an automatically controlled heat exchanger for maintaining the pressure of the generated gas in a storage tank substantially constant in cold climates and under changeable weather conditions. More specifically, the idea is to provide an electrical heater arranged in the storage tank or container in heat exchanging relation with the liquefied gas therein and adapted to be controlled in response to the pressure of the gas. Another aim is to provide a system of this type adapted to meet the rigid requirements of fire underwriters and avoid the danger of an explosion.

Other aims and advantages of the invention will appear in the specification, when considered in connection with the accompanying drawings, wherein:

Fig. 4 is a sectional view taken on the line 4—4 of Fig. 3; and

Fig. 5 is a wiring diagram.

Figure 1:
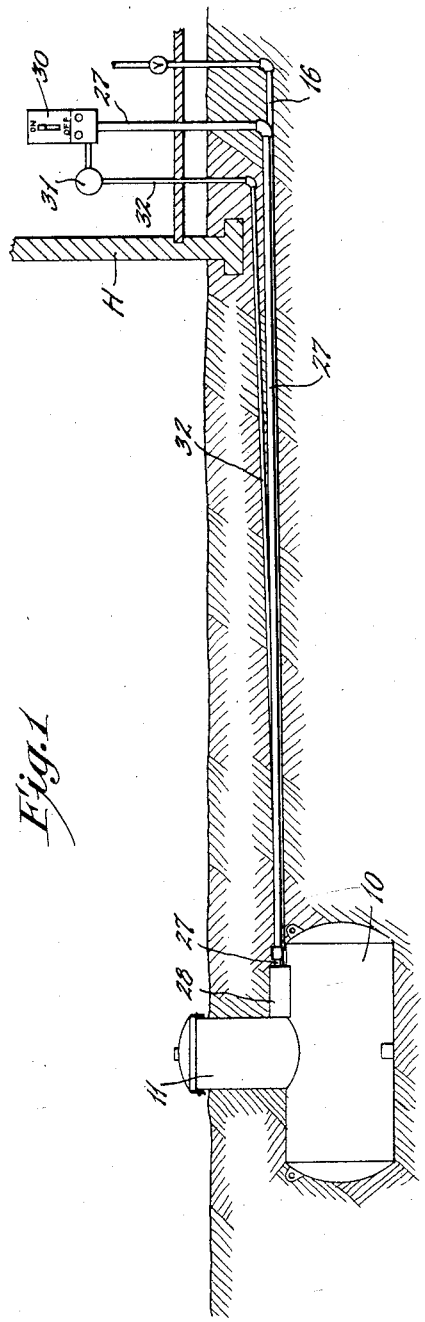
Fig. 1 is a diagrammatic assembly view showing the preferred form of installation applied to a household generating plant.
Figure 2:
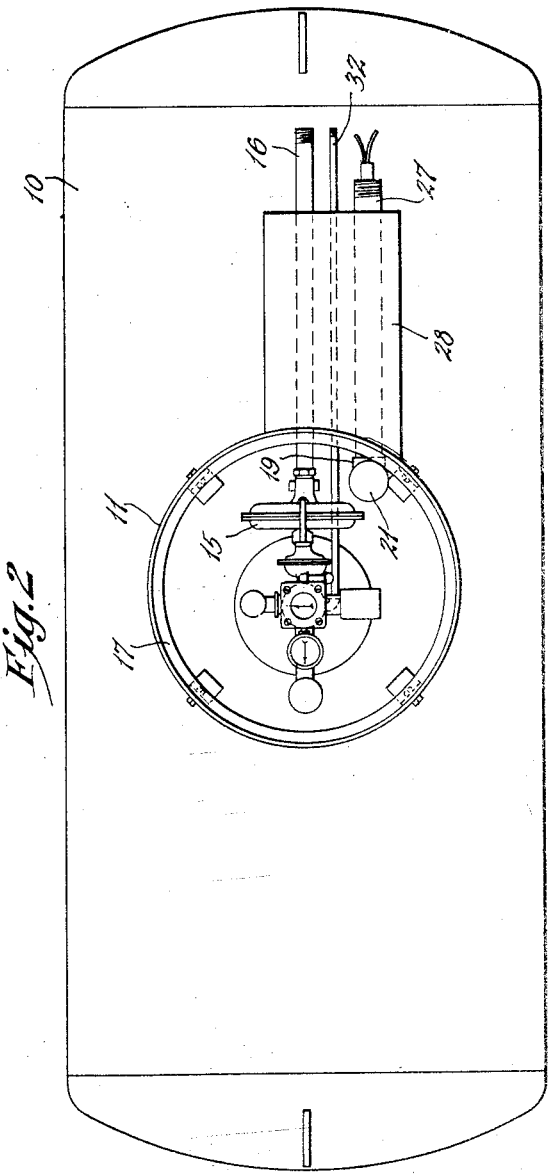
Fig. 2 is a top plan view on an enlarged scale of the generating unit with the cover removed.
Figure 3:
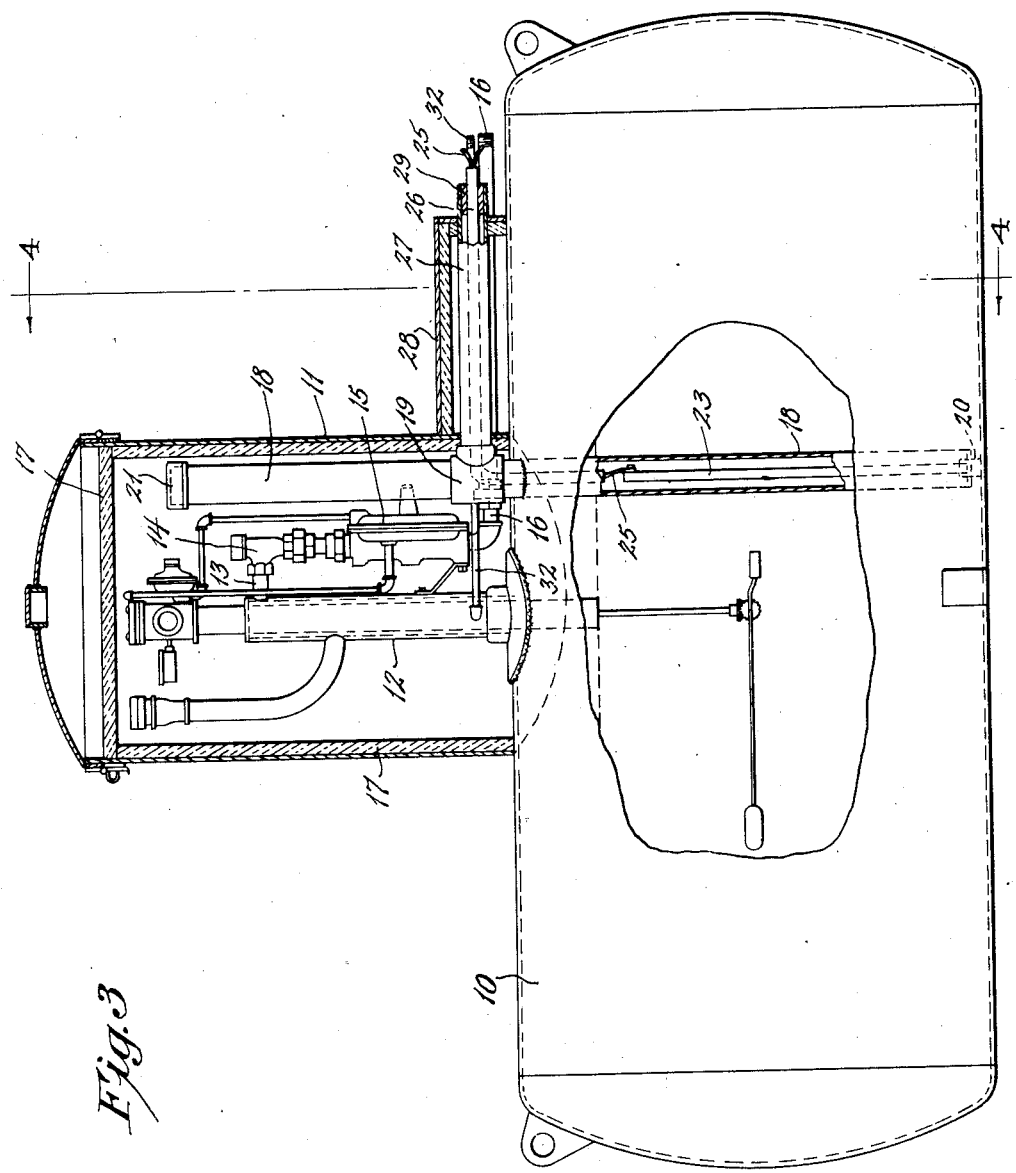
Fig. 3 is a side elevation, partly in section, of the unit shown in Fig. 2.

Referring particularly to the drawings, the system therein shown is of the general type disclosed in the aforesaid patent, wherein liquefied hydrocarbon gas is adapted to be stored under pressure in a storage tank or chamber 10 and the vaporized gas generated therein is delivered through dispensing appurtenances like those shown in my copending application, Ser. No. 98,048, filed August 26, 1936. The tank is adapted to be buried in the ground and the dispensing appliances are protected by an insulated casing 11. The gas generated in the tank passes through a stand pipe 12, nipple 13, a valve 14 and a pressure reducing regulator 15, thence to a service main 16 which leads into a house H, such as an ordinary residence, it being understood that the tank is usually buried in the ground some distance from the house or building.

In cold climates, some difficulty has been experienced because the temperature is sometimes too low to vaporize the liquefied gas and maintain the proper pressure. Consequently, it is necessary to apply some artificial heat to the liquefied gas and thereby maintain the desired working pressure. Due to the rigid requirements of the fire underwriters, the idea of employing ordinary heating devices in conjunction with the tank or storage chamber has been considered impractical. The present invention provides a safe, automatic heat exchanger adapted to maintain the required vaporizing temperature in the tank and thereby insure an adequate supply of gas in the coldest climates.

In accordance with the present invention, the protecting casing 11 for the dispensing appliances is well insulated by a lining of insulating material 17 to prevent the escape of heat. Adjacent to the point where the service main 16 passes through the wall of the housing 11, there is shown a vertical heat exchanging pipe 18 projecting into the tank to a point near the bottom and upwardly in the casing to a point preferably near the ground level, having a T 19 near the level of the service main. The lower end of this pipe is closed and is shown as being secured to the bottom of the tank by a bracket 20. The upper end has a removable cap or closure 21 to afford access to the heating element in the pipe.

Within the pipe 18 and extending below the normal level of the liquid in the tank 10, there is shown an electrical resistance heater, conveniently in the form of a resistance element 22 enclosed in a shield 23 and carrying an ordinary bimetallic thermostat 24 to cut off the current automatically when the temperature of the heating element reaches a predetermined point. The shield serves as a rigid holder for the resistance element and thermostat and also constitutes a fire screen around the element. The electrical conductors 25 leading to the heater element are carried in an asbestos cable or tube 26 and the cable is protected by a pipe or conduit 27 leading from the T 19 and projecting through a small insulated hood-shaped housing 28 which also covers the service pipe 16. The housing 28 is closed at both ends and the conduit 27, is threaded at its outer end to receive an ordinary conduit fitting or coupling. The conduit is shown as having a safety closure plug 29 around the asbestos cable 26 adapted to prevent the escape of any explosive gas in case of leakage into the pipe 18, thus protecting the house. The electrical cable and conduit extend into the house alongside the service pipe and the current is adapted to be controlled both by an ordinary manual switch 30 with a fuse and an automatic pressure operated switch 31, it being understood that the current will be cut off during the summer and the switch 30 will be closed during the cold weather. The pressure operated switch may be of any suitable design, such as an ordinary "mercoid" switch controlled by the pressure in the tank. Herein, it is connected by a pipe 32 to the stand pipe 12. The gas pressure in the stand pipe is always the same as that in the tank. When the pressure, which is dependent upon the temperature of the liquefied gas in the tank, exceeds a predetermined maximum, the pressure operated switch is set to cut off the supply of current to the heating element. Also, the thermostat 24 will prevent the heating element from overheating and generating excessive pressure in the tank.

In cold climates, it is necessary to guard against condensation in the service main. For this purpose, the main is inclined downwardly from the point where it enters the building to the tank so that any condensate will flow downwardly into the main, to be revaporized. When it reaches the insulated hood or casing 28, it is exposed to heat generated in the pipe 18 and delivered to the casing through the connected conduit 27. The heated air in the pipe 18 serves to keep the interior of the housing 17 and of the casing 28 sufficiently warm to revaporize any liquefied gas that may be returned in the service main. The plug 29 in the conduit 27 confines the heated air therein and prevents the heat from being dissipated through the unprotected portion of the conduit to the ground. This is very important in extremely cold climates because condensate formed in the service main would prevent the system from functioning properly.

From the foregoing description, it will be seen that the system is reliable in operation and that the protective features insure safety and comply with the rigid requirements of the fire underwriters. Moreover, the improved automatic heater insures a constant supply of vaporized gas of substantially uniform richness in cold climates.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In a liquefied gas dispensing system having a storage tank buried in the ground in heat exchanging relation with the surrounding earth, dispensing appliances including a pressure regulator connected to the tank; an insulated casing for the dispensing appliances; a gas main connected to the pressure regulator and inclined upwardly from the bottom portion of the casing to the point of use; a closed heat exchanging pipe extending from the interior of said casing into the tank below the normal liquid level therein and having a branch conduit connected thereto extending alongside the gas main; an electrical resistance heater in said pipe within the tank having conductors extending through said branch conduit; a pressure operated switch for controlling said heater having a pipe connected to the tank; a manual switch for said heater; and a thermal switch associated with the heater to prevent it from overheating, the heat delivered through said pipe to said branch conduit serving to revaporize condensed gas returned through the gas main.

2. In a liquefied gas dispensing system having a storage tank buried in the ground in heat exchanging relation with the surrounding earth, dispensing appliances including a pressure regulator connected to the tank; an insulated casing for the dispensing appliances; a gas main connected to the pressure regulator and inclined upwardly from the bottom portion of the casing to the point of use; a closed heat exchanging pipe extending from the interior of said casing into the tank below the normal liquid level therein and having a branch conduit connected thereto extending alongside the gas main; electrical heating means in said pipe within the tank connected to supply supplemental vaporizing heat to the contents of the tank and to deliver some heat to both the casing and the service conduit; and a switch responsive to the pressure in the tank connected to control said heating means.

3. In a liquefied gas dispensing system having a storage tank buried in the ground in heat exchanging relation with the surrounding earth, dispensing appliances including a pressure regulator connected to the tank; an insulated casing for the dispensing appliances; a gas main connected to the pressure regulator and inclined upwardly from the bottom portion of the casing to the point of use; a closed heat exchanging pipe extending from the interior of said casing into the tank below the normal liquid level; and an electrical heater unit in said pipe to supply supplemental vaporizing heat to the contents of the tank and to deliver some heat to the interior of said casing.

4. In a liquefied gas dispensing system having a storage tank buried in the ground in heat exchanging relation with the surrounding earth, dispensing appliances including a pressure regulator connected to the tank; an insulating casing for the dispensing appliances; a gas main connected to the pressure regulator and inclined upwardly from the bottom portion of the casing to the point of use; an electrical heating unit connected to supply supplemental vaporizing heat to the contents of the tank and revaporizing heat to the lowest portion of the gas main; and a switch connected to control the supply of current to said heating unit.

5. In a liquefied gas dispensing system having a storage tank buried in the ground in heat exchanging relation with the surrounding earth, dispensing appliances including a pressure regulator connected to the tank; an insulated casing for the dispensing appliances; a gas main connected to the pressure regulator and inclined upwardly from the bottom portion of the casing to the point of use; a closed heat exchanging pipe extending from the interior of said casing into the tank below the normal liquid level therein and having a branch conduit connected thereto extending alongside the gas main; an insulating housing outside of said casing around said branch conduit and the adjacent portion of said gas main; and an automatic switch connected to control the heater in response to the pressure in said tank.

LOYD J. WHITE.